United States Patent [19]

Neefe

[11] 4,163,608

[45] Aug. 7, 1979

[54] HYDRATABLE GAS PERMEABLE METHYL METHACRYLATE COPOLYMER

[76] Inventor: Charles W. Neefe, P.O. Box 429, Big Spring, Tex. 79720

[21] Appl. No.: 839,750

[22] Filed: Oct. 5, 1977

[51] Int. Cl.$^2$ .................... C08F 20/06; G02C 7/04
[52] U.S. Cl. .................... 351/160 H; 3/13; 260/29.6 TA; 526/304
[58] Field of Search .................... 351/160, 160 H; 260/29.6 TA; 526/304

[56] References Cited

U.S. PATENT DOCUMENTS

| | | | |
|---|---|---|---|
| 3,728,317 | 4/1973 | Blank | 351/160 H |
| 3,803,093 | 4/1974 | Neefe | 351/160 |
| 3,984,485 | 10/1976 | Neefe | 351/160 H |

*Primary Examiner*—John K. Corbin
*Assistant Examiner*—Scott J. Sugarman

[57] ABSTRACT

A gas permeable contact lens material made by copolymerizing methyl methacrylate, N-(1,1-dimethyl-3-oxobutyl) acrylamide and methacrylic acid to form a hard solid contact lens material which may be made soft and hydrophilic by placing the lens in an alkaline solution.

3 Claims, No Drawings

HYDRATABLE GAS PERMEABLE METHYL METHACRYLATE COPOLYMER

RELATED APPLICATIONS

U.S. Pat. No. 3,803,093 discloses a material composed of Methyl methacrylate, N-(1,1-dimethyl-3-oxobutyl) acrylamide and acrylic acid.

U.S. Pat. No. 3,900,250 discloses a semi ridged gas permeable contact lens composed of cellulose acetate butyrate.

U.S. Pat. No. 3,984,485 discloses a material for contact lenses composed of methyl methacrylate, N-(1,1-dimethyl-3-oxobutyl) acrylamide and a crosslinking agent.

U.S. Pat. No. 3,710,796 filed May 1971 discloses a contact lens material made from Ethylene glycol monomethacrylate also known as Hydroxyethyl methacrylate copolymerized with diacetone acrylamide also known as N-(1,1-dimethyl-3-oxobutyl) acrylamide.

U.S. Pat. No. 3,965,063 filed June 30, 1975 discloses a contact lens material composed of Hydroxyethyl methacrylate and N-(1,1-dimethyl-3-oxobutyl) acrylamide and crosslinking agents.

U.S. Pat. No. 3,786,812 filed May 10, 1976 discloses a drug barrier composed of diacetone acrylamide known as N-1,1-dimethyl-3 -oxobutyl) acrylamide, ethylene glycol monomethacrylate known as hydroxyethyl methacrylate, methyl methacrylate and a crosslinker ethylene glycol dimethacrylate.

The present contact lenses are of two types: the soft hydrophilic and the hard hydrophobic. The soft hydrophilic lenses are currently made from cross-linked ethylene glycol monomethacrylate. The hard hydrophobic lenses are currently made from polymethyl methacrylate. The soft hydrophilic lenses are kept sterile by boiling because they tend to absorb antimicrobial agents such as benzalkonium chloride and bind the antimicrobial agents into the lens structure and the lens becomes toxic to the ocular tissue. The hard lenses made from methyl methacrylate do not absorb these antimicrobia agents and therefore may be stored in and cleaned with solutions containing preservatives such as benzalkonium chloride. Lenses made from methyl methacrylate are very hydrophobic and a wetting agent is required for the water to form a smooth layer on the surface of the lens. If no wetting solution is used the water will form beads or droplets on the surface and prevent the lens from forming an image. The contact angle for methyl methacrylate is 60° therefore each droplet will contact the lens surface at an angle of 60°. A wetting agent will lower the wetting or contact angle to approximately 30° which is within range of acceptability.

The plastic herein disclosed has a water contact angle of 0° when hydrated. This provides a greater degree of comfort for the wearer and a reduction in surface friction and less foreign body sensation to the eye.

Contact lenses that are being used at this time depend upon the flow of lachrymal fluids around the edge of the lens to supply the cornea with its necessary oxygen. The cornea tissue maintains a temperature much lower than the other body tissues. This is due to evaporation at the corneal surface, and the lack of blood supply to the cornea. The temperature of the cornea must be at this lower level or its metabolic processes will be accelerated. The plastic now being used for fabricating contact lenses is a very poor conductor of heat. This insulating material covering a large percent of the corneal area raises its temperature which increases the chemical activity of the metabolic processes and the cornea demands more oxygen. The present lenses preclude the free exchange of atmospheric oxygen dissolved in the precorneal fluid from reaching the corneal tissue. The result is edema and epithelium disorganization.

Lenses have been made with small holes drilled through the lens in an effort to overcome this problem. If the holes are large, they will be seen by the wearer, and if small enough not to be seen, they become clogged with body secretions and are rendered useless.

The new and greatly improved contact lens of this invention overcomes these disadvantages by allowing dissolved gases to pass through the material from which the lens is made. The lens is an excellent conductor of heat as it contains water within the lens structure. This water content within the lens material produces a lens which will accept the lachrymal fluids at a very low angle of contact, resulting in a hydrophilic lens and elimination of the necessity of a wetting solution. Present plastics used for contact lenses, on the other hand, are hydrophobic and require a strong wetting agent to render them hydrophilic. Lachrymal fluids and dissolved gases can pass through the lens by diffusion.

The material is hard and rigid in the dehydrated state which allows it to be manufactured by the techniques and processes which have evolved over the past twenty years in the contact lens industry. Polishing is the same as poly-methyl methacrylate except the polishing slurry is made acid.

THE MATERIAL IS MADE AS FOLLOWS

The solid monomer N-(1,1-dimethyl-3-oxobutyl) acrylamide is dissolved in the liquid monomers methyl methacrylate and methacrylate acid and polymerized using any of the standard processes used with methyl methacrylate and well known to the art. Catalysts such as azobis (2 methyl propionitrile), tertiary-butyl-peroctoate, or benzol perioxide may be used to achieve polymerization. The material may be cast in silicone molds to form contact lens blanks or cast in long rods which may be cut in to suitable discs from which contact lenses are made. Excellent results have been realized using a wide range of concentrations of N-(1,1-dimethyl-3-oxobutyl) acrylamide. Concentrations as low as 1% N-(1,1-dimethyl-3-oxobutyl) acrylamide and as high as 50% have been used with excellent results. Methacrylic acid concentrations of 2% to 30% have been used. Crosslinking agents may be added to increase strength and rigidity examples of crosslinking agents which may be used are ethylene dimethacrylate, allyl methacrylate, divinyl benzene, ethylene diacrylate, diethylene glycol diacrylate, and methallyl methacrylate. The finished lenses are treated with a base or alkaline solution such as sodium hydroxide 2%, ammonium hydroxide, or potassium hydroxide. This chemical treatment increases the water absorption of the lens material. The lenses are then placed in normal saline to remove the sodium hydroxide and bring the lenses to equilibrium. The material may be cross-linked before or after hydration to stabilize its water content.

A typical formulation is as follows. In a glass tube place 15 g. N-(1,1-dimethyl-3-oxobutyl) acrylamide, 100 g. methyl methacrylate, 15 g. methacrylic acid, 2 g. of a crosslinking agent such as ethylene dimethacrylate, and .07 g. azobis (2 methyl propionitrile) purge of oxygen and place under a nitrogen blanket and heat to 40° C. for twelve hours and post cure at 70° C. for sixteen hours and cut into contact lens blanks. Lenses are made from this material are found to be exceptionally strong and very durable in use.

The homopolymer of N-(1,1-dimethyl-3-oxobutyl) acrylamide is clear slightly hydrophilic solid. The homopolymer of methyl methacrylate is a clear hard hydrophobic solid. The homopolymer of acrylic acid is hydrophilic. The copolymer of N-(1,1-dimethyl-3-oxobutyl) acrylamide, methacrylic acid, and methyl methacrylate is a clear hard solid which may be hydrated. Increasing the quantity of N-(1,1-dimethyl-3-oxobutyl) acrylamide will increase the oxygen permeability of the hydrated copolymer. The above example of a typical formulation provides an oxygen equivalent of 6.71% at a thickness of 0.15 millimeters. Higher oxygen levels may be obtained by increasing the amount of N-(1,1 dimethyl-3-oxobutyl) acrylamide.

Lenses currently made from the hydrogel ethylene glycol monomethacrylate are very soft and flexible. The lens made from the herein disclosed material is inherently a rigid material which will not deform or wrinkle by eyelid action. It is well known that the hydrogel materials are very soft, pliable materials which will flex, wrinkle and distort in response to eyelid pressure and thereby result in a distorted visual image. Furthermore, the stiff copolymer material recited is ideally suitable for correcting astigmatism. The hydrogel materials will generally conform to the toric cornea and the torosity is present on the front surface of the contact lens, and therefore, the astigmatism remains uncorrected. The material herein disclosed may be chemically sanitized by storage in a solution of sodium chloride 0.9%, thimersol 0.001%, disodium edetate (ethylenediaminetetraacetic acid) 0.1%.

Other applications of this copolymer material include dentures, artificial eyes, and biological implants.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

What is claimed is:

1. A contact lens concave-convex form in section and of a curvature substantially the same as the eye to which it is applied, made of a hydrated oxygen permeable copolymer, providing an oxygen equivalent of 6.71% at a lens thickness of 0.15 millimeters said copolymer consisting of 100 parts by weight methyl methacrylate monomer copolymerized with from 1 to 50 parts by weight of N-(1,1-dimethyl-3-oxobutyl) acrylamide monomer and 2 to 30 parts by weight methacrylic acid.

2. A contact lens of claim 1 hydrated in an alkaline solution.

3. A contact lens of claim 1 having from 0.01 parts to 5 parts by weight a crosslinking agent.

* * * * *